(12) United States Patent
Payne, Jr. et al.

(10) Patent No.: US 8,590,005 B2
(45) Date of Patent: Nov. 19, 2013

(54) MULTI-DOMAIN INFORMATION SHARING

(75) Inventors: Charles N. Payne, Jr., Stillwater, MN (US); Jason D. Sonnek, Lino Lakes, MN (US); Steven A. Harp, Coon Rapids, MN (US); Richard C. O'Brien, Brooklyn Park, MN (US); Johnathan A. Gohde, Arden Hills, MN (US)

(73) Assignee: Adventium Enterprises, LLC, Minneapolis, MN (US)

( * ) Notice: Subject to any disclaimer, the term of this patent is extended or adjusted under 35 U.S.C. 154(b) by 191 days.

(21) Appl. No.: 13/155,446

(22) Filed: Jun. 8, 2011

(65) Prior Publication Data

US 2012/0317569 A1 Dec. 13, 2012

(51) Int. Cl.
*H04L 29/06* (2006.01)
(52) U.S. Cl.
USPC ..................................... 726/1; 726/3; 713/166
(58) Field of Classification Search
USPC ..................................... 726/1, 3; 713/116, 166
See application file for complete search history.

(56) References Cited

U.S. PATENT DOCUMENTS

| 6,922,774 | B2 | 7/2005 | Meushaw et al. |
| 2002/0169987 | A1 | 11/2002 | Meushaw et al. |
| 2007/0282951 | A1 | 12/2007 | Selimis et al. |
| 2009/0241194 | A1 | 9/2009 | Thomas |
| 2009/0265756 | A1 | 10/2009 | Zhang et al. |
| 2012/0151209 | A1* | 6/2012 | Visnyak et al. ............... 713/166 |

FOREIGN PATENT DOCUMENTS

WO   2009142826 A1   11/2009

OTHER PUBLICATIONS

International Search Report and Written Opinion for related PCT Application PCT/US2012/041038, mailed Sep. 19, 2012 (14 pages).
Siqin Zhao, et al., "The Application of Virtual Machines on System Security", IEEE, 2009 (8 pages).
Joseph Loyall, et al., "A Survey of Security Concepts for Common Operating Environments", 2011 14th IEEE International Symposium on Object/Component/Service-Oriented Real-Time Distributed Computing Workshops (10 pages).
Dong Guishan, et al., "A Security Domain Isolation and Data Exchange System Based on VMM", IEEE, 2009 (5 pages).
General Dynamics C4 Systems, TVE Trusted Multilevel Computing Solution, Simultaneous View of Multiple Security Levels on a Single Computer, http://www.gds4c.com/content/detail.cfm?item=35a995b0-b3b7-4097-9324-2c50008b3a75, Jun. 7, 2011, 3 pgs.

* cited by examiner

*Primary Examiner* — Jeffrey Pwu
*Assistant Examiner* — Thong Truong
(74) *Attorney, Agent, or Firm* — Brooks, Cameron & Huebsch, PLLC

(57) ABSTRACT

The present disclosure includes methods and systems for multi-domain information sharing. One or more embodiments can include a computing device with a VMM hosting a first information domain VM, a second information domain VM, and a cross-domain solution VM that controls information transfer between the first information domain VM and the second information domain VM. One or more embodiments can also include a hypervisor to enforce an isolation policy within the system.

20 Claims, 4 Drawing Sheets

MULTI-DOMAIN INFORMATION SHARING

GOVERNMENT RIGHTS

The subject matter of this disclosure was made with government support under Contract Number N00014-10-C-0121 awarded by the Office of Naval Research (ONR). Accordingly, the U.S. Government has certain rights to subject matter disclosed herein.

BACKGROUND

Multi domain information sharing (MDIS) relies on a cross domain solution (CDS) to move information between different security domains. A CDS can include an integrated system of hardware and software that enables transfer of information among incompatible security domains or levels of classification. A CDS can include solutions for information assurance that provide the ability to manually or automatically access, or transfer information between two or more differing security domains. Three common types of CDS include access, multilevel, and transfer CDS. An access-type CDS enables user interaction with multiple domains from a single computer, but strictly isolates each interaction to a single domain at a time and permits no information flow between domains. A multilevel-type CDS also enables user interactions with multiple domains from a single computer, but permits simple information flow between domains as regulated by a mandatory security policy. A transfer-type CDS permits information flow between domains as regulated by a more complex mandatory security policy, but it does not enable user interaction to those domains from the same computer that enables the information flow. Instead, user interaction with a domain requires accessing a separate computer designated for that domain.

A transfer-type CDS, which can also be referred to as a guard, may be deployed at the edge of a physical network that defines a security domain. In order for information to flow from one domain to a different domain, there must be a suitable guard between them, and the guard must provide the only communication link between those domains. As the number of domains that require information flow between them increases, so do the number of guards to be deployed and managed. In addition, virtualizing computer hosts and computer networks can limit the ability to rely on physical hardware isolation to guarantee non-bypassability of the guard.

DETAILED DESCRIPTION

Figure 1:
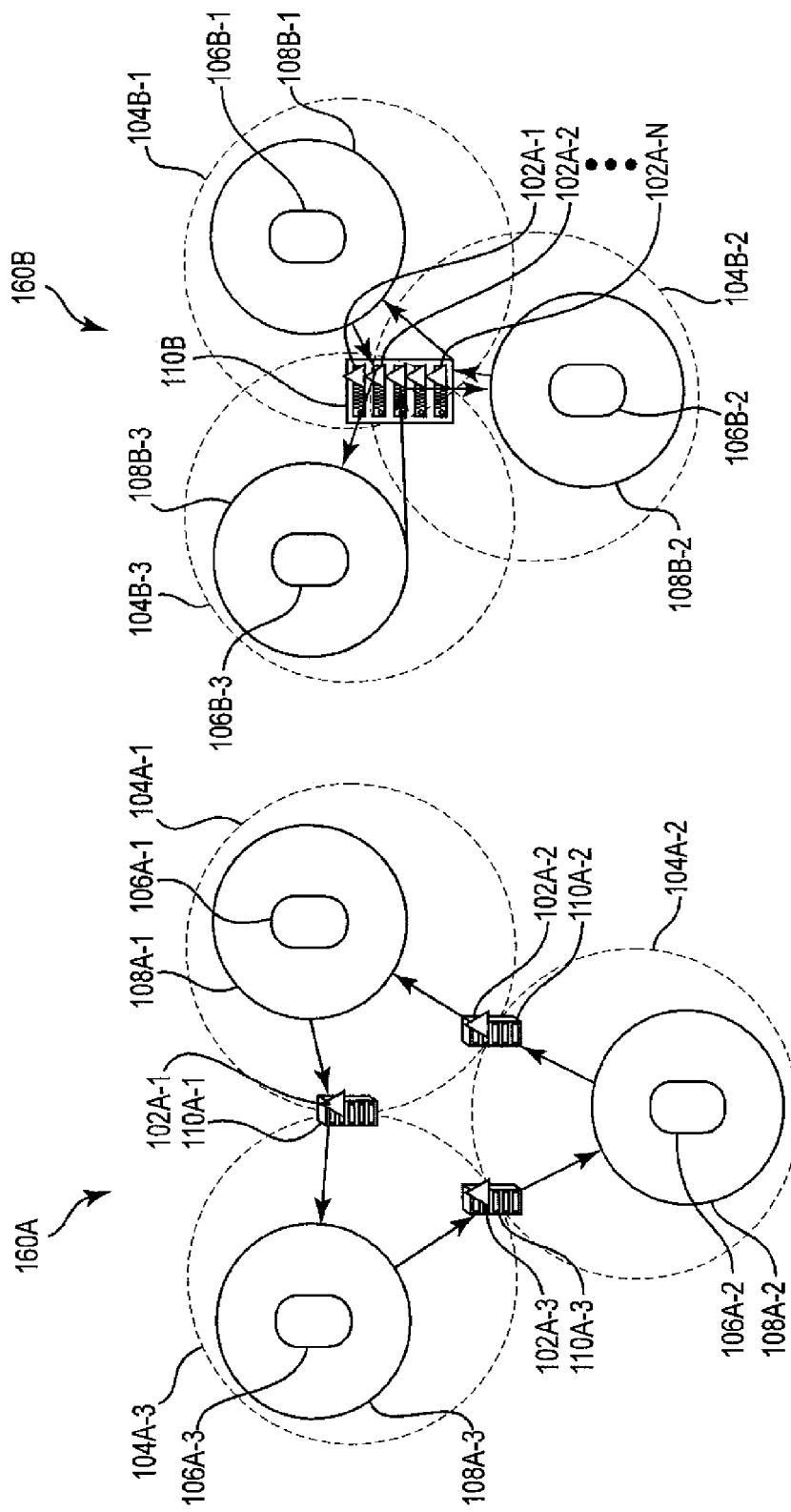
FIG. 1A illustrates a diagram of a prior art multi-domain information sharing architecture.
FIG. 1B illustrates a diagram of a prior art multi-domain information sharing architecture.

The present disclosure includes methods and systems for multi-domain information sharing. One or more embodiments can include a computing device hosting a first information domain virtual machine (VM), a second information domain VM, and a cross-domain solution VM that controls information transfer between the first information domain VM and the second information domain VM. One or more embodiments can also include a hypervisor to enforce an isolation policy within the system. One or more embodiments can also include multiple VMs for each information domain.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 302 may reference element "02" in FIG. 3, and a similar element may be referenced as 402 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

Various embodiments of the present disclosure can be performed by software and/or firmware (i.e., computer executable instructions), hardware, application modules, and the like, executable and/or resident on the tools, systems, and devices shown herein or otherwise. As used herein, a hypervisor, or virtual machine monitor (VMM), refers to executable instructions (e.g., software) that provide virtualization support for one or more virtual machines (VMs). A hypervisor itself may require a privileged VM to emulate hardware and firmware calls for the unprivileged VMs. The privileged VM can provide interfaces to virtual hardware devices that the hypervisor can export to unprivileged VMs. The privileged VM can translate operations on these virtual hardware devices to operations on shared physical hardware devices. This privileged VM enjoys a "privileged" view of the internal operation of the unprivileged VMs. A VM operates like a standalone computer, (e.g., with an operating system, applications, etc.) except that it runs in the virtualized environment provided by the hypervisor. The term "domain" as used herein, unless specifically stated otherwise, refers to an information domain (e.g., a security domain, which can have different privacy and/or security levels, associated therewith) unless specifically stated otherwise.

Multidomain information sharing generally assumes the availability of the guard to each domain despite potentially faulty networks; however, that assumption is not always valid. For example, a mobile user may wish to distribute (e.g., to a coalition partner), a classified document that has information removed to reduce the classification from a higher level to a lower one (e.g., a sanitized report) even though the high security network (e.g., high-side network) is inaccessible. This user needs to operate through network loss. In other multi-domain networks, the entire network may be managed from the highest domain, requiring that network management directives intended for the lower security domains be passed through a guard. If the guard is located on a remote high security network and that network becomes inaccessible, the user may be prevented from managing the less sensitive domains. In that case, network availability may depend on the guard.

MDIS also imposes isolation policies and cross-domain policies. An isolation policy can require that domains are isolated from one another and that only a CDS enables information flow between domains. Reducing the amount of shared resources such as memory and processing resources may also be required by the isolation policy. For example, reducing the amount of a VM's hardware and firmware resources that must be emulated by the hypervisor increases the trust in the hypervisor because the hypervisor is not relied upon to sanitize the resources between use by different VMs. A cross domain policy can require that information flowing between domains satisfies certain constraints.

Separation kernels (SKs) can provide virtualization in a high assurance environment that enforces an isolation policy. However, an SK may not provide the emulation of network layer hardware and firmware resources that are required by the guard in a manner that satisfies the isolation policy. Therefore, SKs may require additional certification of their emulation support.

FIG. 1A illustrates a diagram 160A of a prior art multi-domain information sharing architecture. A transfer-type CDS (e.g., guards 102A-1, 102A-2, and 102A-3) is typically deployed at the edge of a physical network that defines a security domain. FIG. 1A illustrates a typical MDIS architecture for an enterprise user, and the MDIS architecture shown in FIG. 1A assumes network availability. In order for one domain (e.g., domains 104A-1, 104A-2, and 104A-3) to share information with a different domain (e.g., domains 104A-1, 104A-2, and 104A-3), there must be a suitable guard (e.g., guards 102A-1, 102A-2, and 102A-3) between them. The guards 102A-1, 102A-2, and 102A-3 may be hosted on computing systems 110A-1, 110A-2, and 110A-3, respectively. For example, domain 104A-1 is separated from domain 104A-2 by guard 102A-2, and domain 104A-1 is separated from domain 104A-3 by guard 102A-1. Information flow is illustrated by arrowed lines. As a network grows, and the need for MDIS increases, the proliferation of guards may create higher costs and more complex network management. Furthermore, centralized guards can introduce a single point of failure or attack to a system.

Also illustrated in FIG. 1A are network users 106A-1, 106A-2, and 106A-3 within enclave networks 108A-1, 108A-2, and 108A-3, respectively. Enclave networks, such as networks 108A-1, 108A-2, and 108A-3, can be a collection of computer resources that are to be protected at the same level (e.g., the same security level) and are associated in some way (e.g., via a shared network).

FIG. 1B illustrates a diagram of a prior art multi-domain information sharing architecture. FIG. 1B can be an alternate implementation of the multi-domain information sharing architecture illustrated in FIG. 1A. FIG. 1B illustrates guards 102A-1, 102A-2, and 102A-3 relocated to co-exist in computing system 110B. The computing system 110B can host multiple guards in either a physical or a virtual environment. Computing system 110B can contain guards 102A-1, 102A-2, ..., 102A-N, and domains 104B-1, 104B-2, and 104B-3 may be unchanged from domains 104A-1, 104A-2, and 104A-3 of FIG. 1A.

Certification of a guard can address the risk of operating an information system in a specific environment. Specifically, certification is the process of comprehensively evaluating technical and non-technical features of an information system, so that a Designated Approving Authority (DAA) can determine whether or not the system is approved to operate at an acceptable level of risk based on the implementation of an approved set of technical, managerial, and procedural safeguards. Certification often assumes physically separate networks; however, as illustrated in FIG. 1B, networks need not be physically separated in order for a pre-certified guard to be used. Also illustrated in FIG. 1B are network users 106B-1, 106B-2, and 106B-3 (e.g., users on computing devices) operating within enclave networks 108B-1, 108B-2, and 108B-3, respectively.

Figure 2:
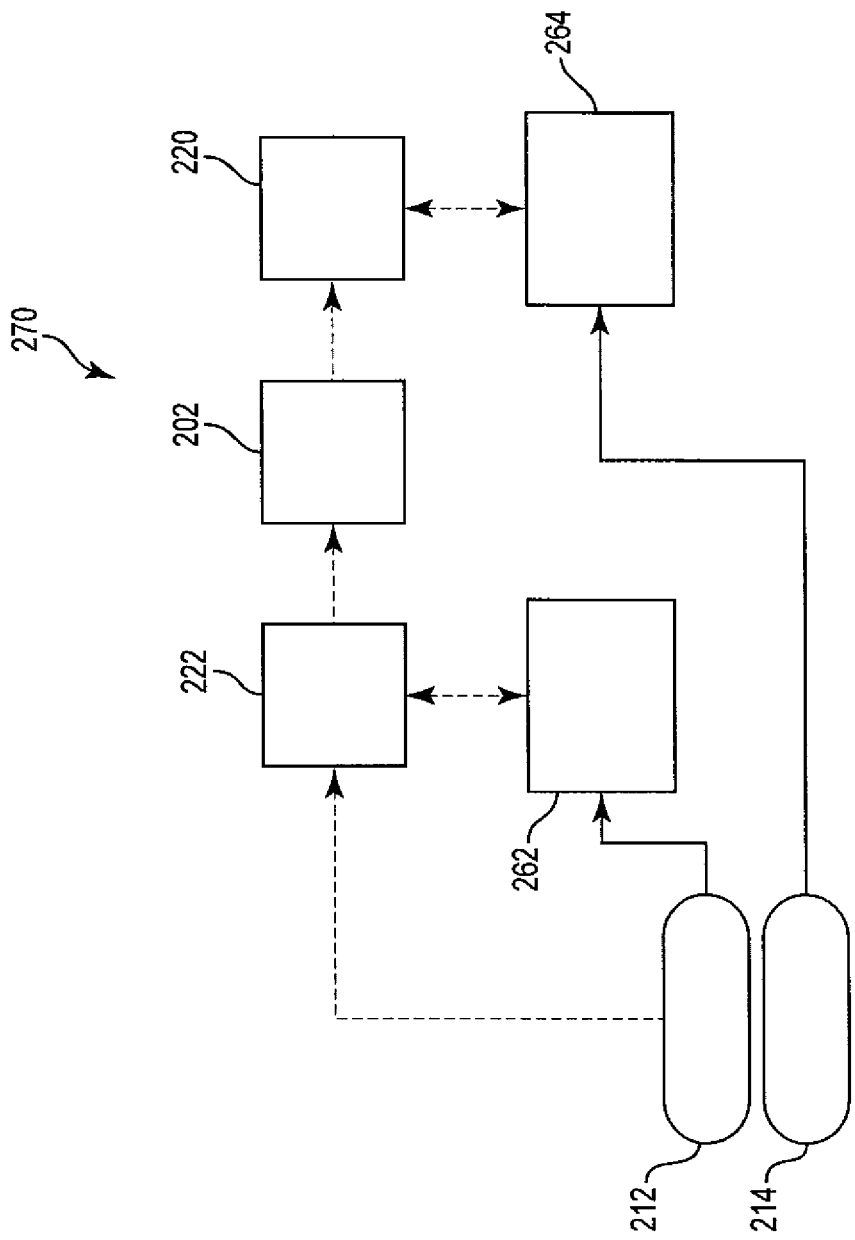
FIG. 2 illustrates a diagram of a prior art example system for multi-domain information sharing.

FIG. 2 illustrates a diagram 270 of a prior art example system for multi-domain information sharing. Diagram 270 illustrates a guard 202 that can allow for network management moving from a high-security side to a low-security side. The dashed arrowed lines of FIG. 2 represent the flow of control, while the solid arrowed lines represent the flow of data. A multi-domain network can include a guard 202, as well as high-security network manager 222 and low-security network manager 220. Network managers 222 and 220 are connected to network communication devices 262 and 264, respectively. Data may be sent to high-security network communication device 262 and low-security network communication device 264 from high side network 212 and low side network 214, respectively. High side network 212 can contain information at a higher classification level than that in the low side network 214, for instance. Control can flow from high side network 212 to network manager 222, which issues commands to high-security network communications device 262. Control can also flow via network manager 222 and guard 202 to low-security network manager 220, which issues commands to low-security network communication device 264. In the system of diagram 270, the managers 222 and 220 and guard 202, are not confined to a single computing system. For instance, the managers 222 and 220 and guard 202 are each located on separate computing devices.

Figure 3:
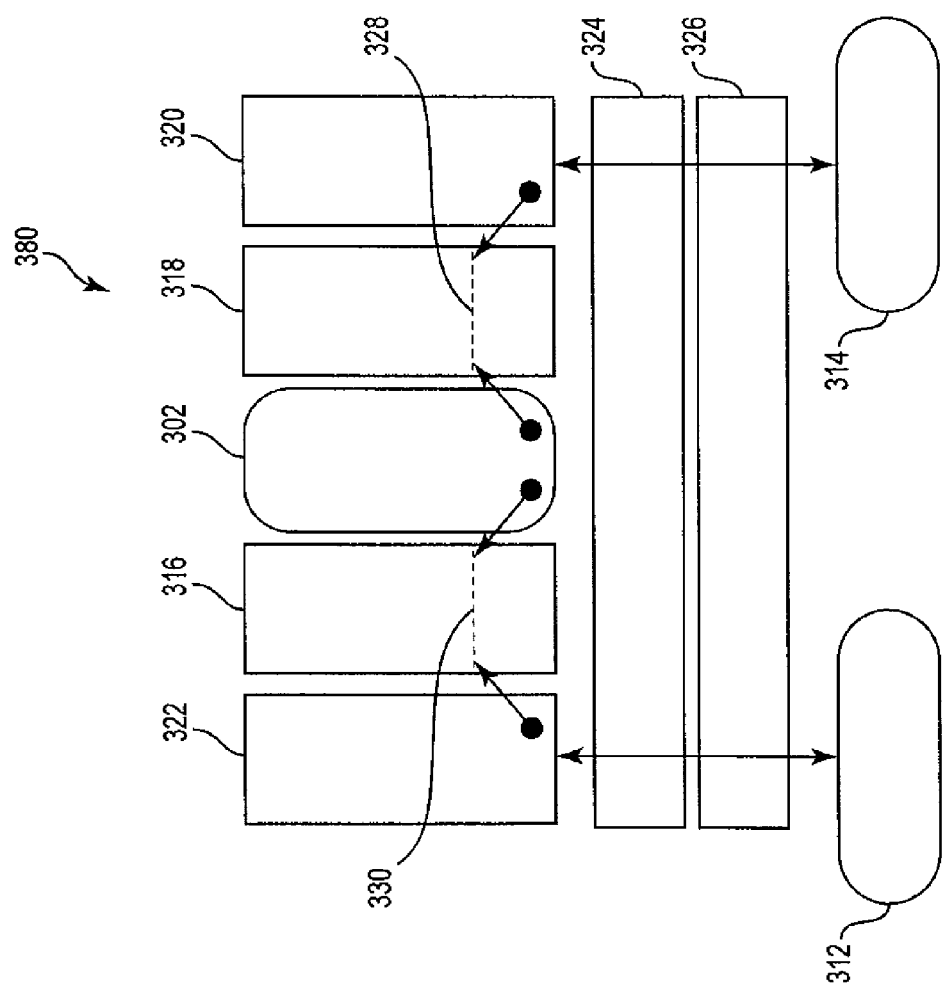
FIG. 3 illustrates an example system for multi-domain information sharing in accordance with one or more embodiments of the present disclosure.

FIG. 3 illustrates an example system 380 for multi-domain information sharing in accordance with one or more embodiments of the present disclosure. System 380 is self-contained, can perform through loss of network connectivity, and is not dependent on network topology. System 380 can comprise a hypervisor hosting a first information domain VM 322, a second information domain VM 320, and a guard VM 302 that controls information transfer between first information domain VM 322 and second information domain VM 320. The hypervisor can be hosted on a single computing device having memory and processing resources. In some embodiments, at least some of the memory and processing resources of the computing device is partitioned between a first information domain VM (e.g., domain VM 322), a second information domain VM (e.g., domain VM 320), and a guard VM (e.g., guard VM 302). In one or more embodiments, the first and/or second information domains (e.g., domains 320 and 322) can be supported by multiple VMs.

System 380 can also include bridge VMs 316 and 318 that implement a virtual, network layer connection, called a bridge, for information transfer (e.g., bridges 330 and 328). Bridge VMs 316 and 318 can be configured to implement a virtual, bridged network with no attached physical network interface controllers (NICs) (e.g., network interface cards). The architecture of system 380 can also increase protection from a denial of service act (e.g., a denial-of-service attack). For instance, because guard VM 302 cannot be accessed by outside networks except through domain VMs 322 and 320, it is less susceptible to a denial-of-service act by an outside party.

Guard VM 302, which may be an existing, certified guard, allows for only data that meets certain criteria to pass from one domain to another. For example, guard VM 302 can decide if certain information from a high security domain VM 322 can be passed along to a low security domain VM 320. The criteria may be simple (e.g., antivirus scanning) or complex (e.g., human reviewers examine and approve). Guard VM 302 can also have a target preexisting security certification associated therewith. The preexisting security certification can include an assumption of the existence of physically separate networks to which guard VM 302 will connect. The preexisting security certification can also include a target security level. For example, the security level desired can include "confidential" or "top secret." Furthermore, guard VM 302 can have an associated network separation assumption that computing resources in each domain are physically isolated.

First information domain VM 322 can be a high-security information domain for classified information and second information domain VM 320 can be a low-security information domain for information that does not include classified or highly classified information. Security domains (e.g., high- and low-security information domain VMs 322 and 320) can be applications or collections of applications that all trust a common security token for authentication or authorization. Security domains may be determining factors in the classification of an enclave of servers or computing systems. Domains in system 380 are not limited to high- and low-security domains.

Low-security information domain VM 320, which may also be referred to as the "low side" can handle unclassified information. High-security information domain VM 322, which may also be referred to as the "high side" can handle classified information or information at a higher classification level than low-security information domain VM 320. Information passed between the domains may also be referred to as red (classified) and black (unclassified). The low side VM 320 is connected via a NIC to low side network 314 containing unclassified information. The high side VM 322 is connected via a NIC to high side network 312 containing information at a higher classified level than that in the low side network 314.

Bridge VMs 316 and 318, guard VM 302, and information domain VMs 322 and 320 can be hosted on a hypervisor, which may provide emulated hardware and firmware resources (e.g., processors, network adapters, and storage) to bridge VMs 316 and 318. Guard VM 302 is the only guest on the virtual platform that communicates with the domain VMs 322 and 320. For instance, guests associated with information domain VMs 322 and 320 cannot communicate directly with each other, but can communicate with the guard VM 302.

Hypervisor 326 can enforce an isolation, or independence, policy on system 380. The isolation policy provides (e.g., can require) that a high guest (e.g., high-security domain VM 322) cannot influence the behavior of a low guest (e.g., low-security domain VM 320) except as allowed by the guard (e.g., guard VM 302). Reducing the vulnerability of hypervisor 326 (e.g., hardening hypervisor 326) and restructuring its code (e.g., refactoring hypervisor 326) can result in higher system assurance. Software that comprises hypervisor 326 may also be rewritten in order to reach a higher trust level. Hypervisor 326 can be supported by formal models and methods, as well as logical argument, and hypervisor 326 can rely on a highly assured, privileged VM. With guest support, hypervisor 326 can also provide a native network abstraction that can support a pre-certified, or legacy, guard (e.g., guard 302). An example of hypervisor 326 is a Naval Research Labs (NRL) Xenon separation hypervisor.

Hypervisor 326 can enforce an isolation policy, and as a result, each of information domain VMs 322 and 320 is isolated, both in memory and processing, from each other and from the bridge VMs 316 and 318 and the guard VM 302. Hypervisor 326 can also provide guest isolation. Guest isolation means that the isolation policy asserted by a formal model is satisfied. Furthermore, guest isolation means that any information sharing policies must occur in the guests themselves, which may be a desirable trait for a separation hypervisor (e.g., hypervisor 326).

Hypervisor 326 can ensure isolation in terms of shared processing and memory resources. The bridge VMs 316 and 318, coupled with the isolation guarantees of hypervisor 326, ensure network isolation. Input/Output Memory Management Unit (IOMMU)-supported device passthrough can be used to provide exclusive access to other (optional) hardware devices as required by the VMs. These hardware devices might include physical network adaptors, human computer interface devices or storage devices.

Domain VMs (e.g., high-security information domain VM 322 and low-security information domain VM 320) and guard VM 302 can communicate using standard networking protocols, which can allow for leverage of a pre-certified guard (e.g., guard VM 302). The virtual networking structure of system 380 can allow domain VMs 320 and 322 to access their respective networks, but not access each other. This structure results in only the guard VM 302 communicating with domain VMs (e.g., high-security information domain VM 322 and low-security information domain VM 320). This structure can be built on several technologies (e.g., Xen technologies), including IOMMU-supported device pass-through (e.g., a network adapter) for physical network interface devices and bridge VMs, among others. The structure of system 380 does not enforce a policy, but rather controls the flow of traffic between guests by the configuration of its virtual networks.

In a conventional deployment, such as in system 270 illustrated in FIG. 2A, a high-security domain 222, a low-security domain VM 220, and a guard 202 are isolated from each other in terms of processing and resources. However, in the virtualized platform structure of system 380, low-security domain VM 320, high-security domain VM 322 and guard VM 302 share the memory and storage resources that are exported by hypervisor 326. The virtualized platform can attempt to ensure separation to the greatest degree possible in order to validate the network isolation assumptions of the pre-certified guard VM 302. A virtualized platform to support MDIS may rely on a guard VM (e.g., guard VM 302).

System 380 can satisfy high level MDIS requirements including domain isolation, secure transfer, and the minimization of shared resources. Hypervisor 326 can work to prevent unauthorized flows between guests, which can result in domain isolation. Information can also be restricted to flowing via isolated virtual networks to result in secure transfer. In order to minimize shared resources, system 380 can move shared resources (e.g., networking, video, keyboard, mouse) out of privileged VM 324. A typical privileged guest (e.g., privileged VM 324) can have special privileges including the ability to cause new domains to start. A privileged guest may also have the ability to access hardware directly, and it can be responsible for running all of the device drivers for the hardware. System 380 may attempt to limit these privileges and not trust privileged guest 324. By doing so, hypervisor 326 enforces the isolation policy. However, the hypervisor 326 may not require a privileged VM to enforce this policy.

Each component of system 380 can maintain its own operating system. Such components can include high-security domain VM 322, bridge VM 316, guard VM 302, bridge VM 318, low-security domain VM 320, hypervisor 326, and privileged VM 324.

Figure 4:
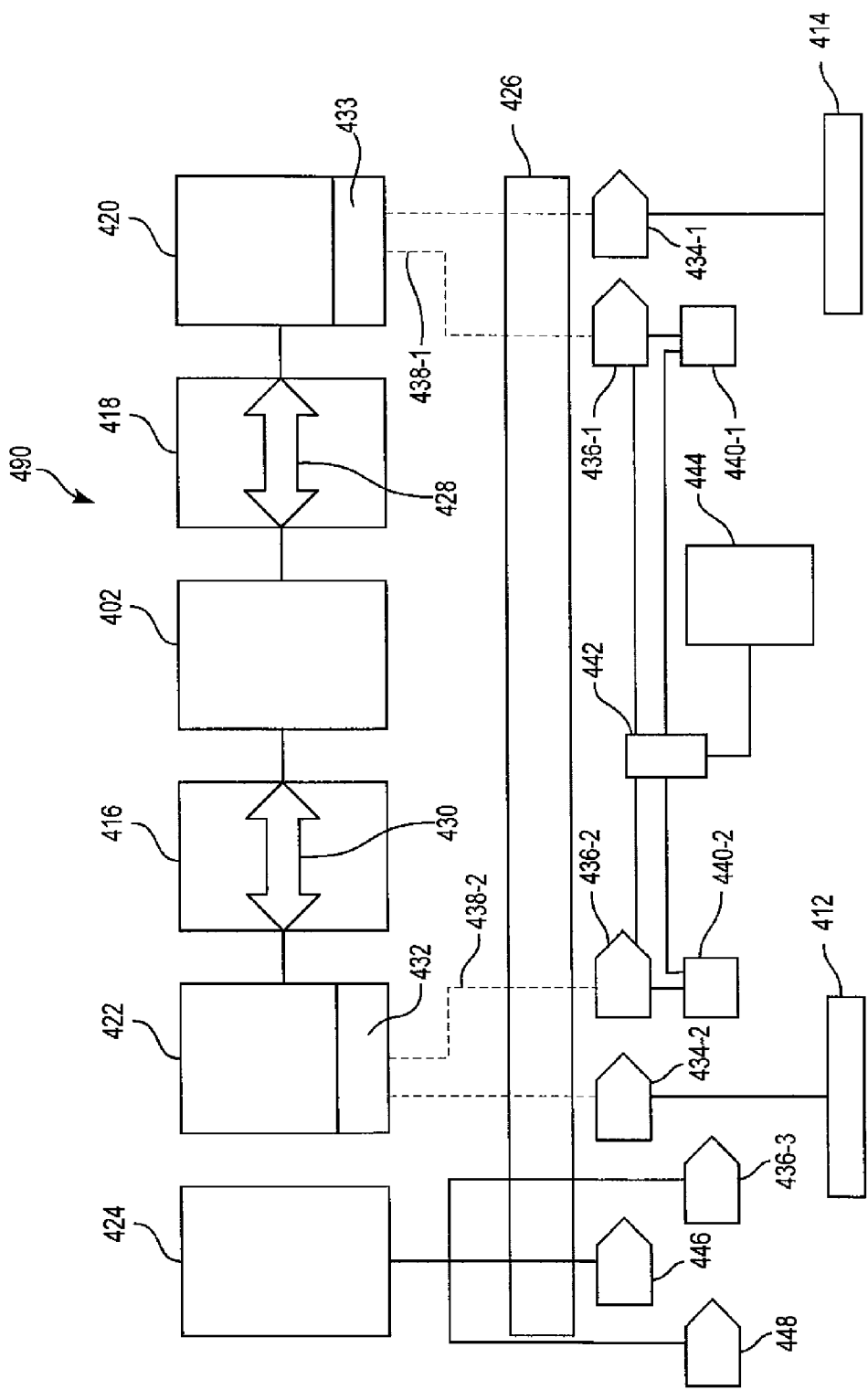
FIG. 4 illustrates an example system for multi-domain information sharing in accordance with one or more embodiments of the present disclosure.

FIG. 4 illustrates an example system 490 for multi-domain information sharing in accordance with one or more embodiments of the present disclosure. FIG. 4 illustrates the isolation capabilities of system 490. Isolation can include relying on a hardware input/output memory management unit (IOMMU) to enable an unprivileged VM exclusive access to a physical hardware device. Such exclusive access may be granted to both the network (e.g., to physical network adaptors) and to the human computer interface (e.g., to a physical keyboard, mouse or video display).

System 490 includes high-security domain VM 422 and low-security domain VM 420 connected to guard VM 402 by bridge VM 416 and bridge VM 418, respectively. Bridge VMs 416 and 418 include virtual bridges 430 and 428, respectively, for information transfer. Bridge VM 416 can facilitate communication between high-security information domain 422 and guard 402 via virtual bridge 430, and bridge VM 418 can facilitate communication between low-security information domain VM 420 and guard VM 402 via virtual bridge 428.

System 490 also includes hypervisor 426 to implement a system isolation policy and validate an associated separation assumption of the guard VM 402. The system isolation policy can prevent a first VM (e.g., domain VM 422) from influencing a second VM (e.g., domain VM 420), and the associated separation assumption can include an assumption by guard VM 402 that domain VMs 422 and 420 are physically separated. As such, the guard VM 402 can behave similar to a transfer-type CDS.

System 490 can also include unprivileged VMs that can provide device emulation necessary to support VMs 422 or 420. An emulator run by privileged guest 424 can duplicate (provide an emulation of) the functions of a first system using a second system, so that the second system behaves like (and appears to be) the first system. In some embodiments, privileged guest 424 does not run the emulator, which can result in a reduction of shared resources.

Low side VM 420 and high side VM 422 are connected to low side network 414 and high side network 412 via individual NICs 434-1 and 434-2, respectively. High side 422 can be connected to one or more high side networks via multiple NICs. In various embodiments high and low side VMs 422 and 420, bridge VMs 416 and 418, bridges 430 and 428, and guard VM 402 are be hosted on a hypervisor of a single computing device. High and low side VMs 422 and 420, bridge VMs 416 and 418, bridges 430 and 428, and guard VM 402 can also be hosted on a plurality of virtual machines or virtual platforms.

High side VM 422 and low side VM 420 can also be connected to USB controllers 436-2 and 436-1, respectively. This connection can be made via IOMMU-supported device pass-throughs 438-2 and 438-1, respectively. Each USB controller 436-1 and 436-2 can be connected to graphic adaptors (or graphics cards) 440-1 and 440-2, respectively. USB controller 436-1 and 436-2 and graphic adaptors 440-1 and 440-2 can connect keyboard/video/mouse (KVM) switch 442 to system 490 as a whole. The KVM switch 442 may be a hardware device that allows a user to control multiple computers (or information domains) from a single keyboard, video monitor and mouse (e.g., keyboard, video monitor, and mouse 444). The single keyboard, video monitor, and mouse 444 is connected to the system 490 via the KVM switch 442.

Privileged guest 424, if included, can be connected to a disk controller 446, a USB controller 436-3, and a video graphics array (VGA) 448. Privileged guest 424 may be optionally connected to KVM switch 442. Disk controller 446 can allow privileged guest 424 to communicate with a hard disk, floppy disk or other kind of disk drive.

For graphical isolation, system 490 may rely on IOMMU supported device passthrough. The high side VM 422, low side VM 420, or guard VM 402 can be assigned a graphics adaptor to aid in the isolation. In another example of graphical isolation, each high side VM 422, low side VM 420, or guard VM 402 can be assigned a USB controller with attached graphics adapter. These strategies may be used to reduce shared VM resources.

System 490 can also include unprivileged VMs 432 and 433, which provide hardware emulation support to domain VMs 422 and 420, respectively. By moving the emulation out of the single privileged VM (e.g., privileged VM 424) and into multiple unprivileged VMs (e.g., 432 and 433), system 490 can eliminate dependence on a shared emulator, thereby reducing the amount of shared resources between VMs. Unprivileged VMs 432 and 433 are provided with the trust that was once given to privileged guest 424. This may be preferred to a privileged VM running an emulator because should the unprivileged VM be compromised, the other VMs would not be affected.

CONCLUSION

The present disclosure includes methods and systems for multi-domain information sharing. One or more embodiments can include a computing device hosting a first information domain virtual machine (VM), a second information domain VM, and a cross-domain solution VM that controls information transfer between the first information domain VM and the second information domain VM. One or more embodiments can also include a hypervisor to enforce an isolation policy within the system.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for multi-domain information sharing, comprising:
   a computing device hosting:
      a first information domain virtual machine (VM);
      a second information domain VM;
      a cross-domain solution VM that controls information transfer between the first information domain VM and the second information domain VM;
      a first bridge VM;
      a second bridge VM;
      wherein the first bridge VM isolates the cross-domain solution VM by providing a first virtual bridge between the first information domain VM and the cross-domain solution VM and the second bridge VM isolates the cross-domain solution VM by providing a second virtual bridge between the second information domain VM and the cross-domain solution VM; and
      wherein the first bridge VM is accessible only to an outside network via the first information domain VM and wherein the second bridge VM is accessible only to the outside network via the second information domain VM; and
      a hypervisor to enforce an isolation policy within the system.

2. The system of claim 1, wherein the first information domain VM is associated with a first network and the second information domain VM is associated with a second network, and wherein the hypervisor is configured to allow the first information domain VM access to the first network and to allow the second information domain VM access to the second network while preventing communication between the first information domain VM and the second information domain VM.

3. The system of claim 2, wherein the first network has access to the first bridge VM via the first information domain VM and the second network has access to the second bridge VM via the second information domain VM while preventing communication between the first network and the first bridge VM and the second network and the second bridge VM.

4. The system of claim 1, wherein the hypervisor hosts the first information domain VM, the second information domain VM, and the cross-domain solution VM.

5. The system of claim 1, wherein the cross-domain solution has a target pre-existing security certification associated therewith.

6. The system of claim 1, wherein the isolation policy prevents the first information domain VM and the second information domain VM from influencing each other.

7. The system of claim 1, wherein the first information domain VM is a high-security information domain VM connected to a high-security network via a network interface controller, and the second information domain VM is a low-security information domain VM connected to a low security network via a network interface controller.

8. The system of claim 1, wherein the cross-domain solution is accessible only to the outside network via the first information domain VM or the second information domain VM.

9. The system of claim 1, wherein the cross-domain solution VM controls the information transfer based on certain constraints and has an associated network separation assumption.

10. The system of claim 1, wherein the computing device further hosts a privileged VM and wherein the first virtual bridge and the second virtual bridge are implemented independently of the privileged VM.

11. A system for multi-domain information sharing, comprising:
   a computing device hosting:
      a high-security information domain VM;
      a low-security information domain VM;
      a cross-domain solution VM including a target pre-existing security certification associated therewith that controls information transfer between the high-security information domain VM and the low-security information domain VM;
      a first bridge VM;
      a second bridge VM;
      wherein the first bridge VM isolates the cross-domain solution VM by facilitating communication between the high-security information domain VM and the cross-domain solution VM via a first virtual bridge and the second bridge VM isolates the cross-domain solution VM by facilitating communication between the low-security information domain VM and the cross-domain solution VM via a second virtual bridge; and
      wherein the first bridge VM is accessible only to an outside network via the high-security information domain VM and wherein the second bridge VM is accessible only to the outside network via the low-security information domain VM; and
      a hypervisor to enforce a system isolation policy that isolates the high-security domain from the low-security domain.

12. The system of claim 11, wherein at least one of the high-security domain VM and the low-security domain VM relies on an unprivileged VM for hardware and firmware emulation support in order to remove trust from a privileged guest for that function.

13. The system of claim 11, wherein the computing device includes memory and processing resources, at least a portion of which are partitioned between the high-security information domain VM, the low-security information domain VM, and the cross-domain solution VM.

14. The system of claim 11, wherein the hypervisor hosts the high-security information domain VM, the low-security information domain VM, and the cross-domain solution VM.

15. A method for multi-domain information sharing, comprising:
   hosting, on a hypervisor of a computing device, a first VM associated with a first information domain on the hypervisor;
   hosting a second VM associated with a second information domain on the hypervisor;
   hosting a guard VM, wherein the guard VM controls information transfer between the first VM and the second VM;
   hosting a first bridge VM;

hosting a second bridge VM;

wherein the first bridge VM isolates the guard VM by facilitating communication between the first VM and the guard VM via a first virtual bridge and the second bridge VM isolates the guard VM by facilitating communication between the second VM and the guard VM via a second virtual bridge; and wherein the first bridge VM is accessible only to an outside network via the first VM and wherein the second bridge VM is accessible only to the outside network via the second VM; and enforcing a system isolation policy that isolates the first VM from the second VM using the hypervisor.

16. The method of claim 15, wherein the first information domain VM is a high-security information domain VM, and the second information domain VM is a low-security information domain VM.

17. The method of claim 15, wherein the computing device includes memory and processing resources, and wherein the method includes sharing at least some of the memory and processing resources by the first VM, the second VM, and the guard VM.

18. The method of claim 15, further comprising performing the method through a loss of network connectivity.

19. The method of claim 15, wherein the system isolation policy includes at least one of memory and processing isolation provided by the hypervisor, network isolation provided by the hypervisor and the first and second bridge VMs, and device isolation provided by an Input/Output Memory Management Unit (IOMMU).

20. The method of claim 15, wherein the cross-domain solution has a target pre-existing security certification associated therewith and an associated network separation assumption.

* * * * *